July 15, 1947.  R. E. BARR  2,424,138
WOODPECKER DRILL
Filed Sept. 27, 1943  11 Sheets-Sheet 4
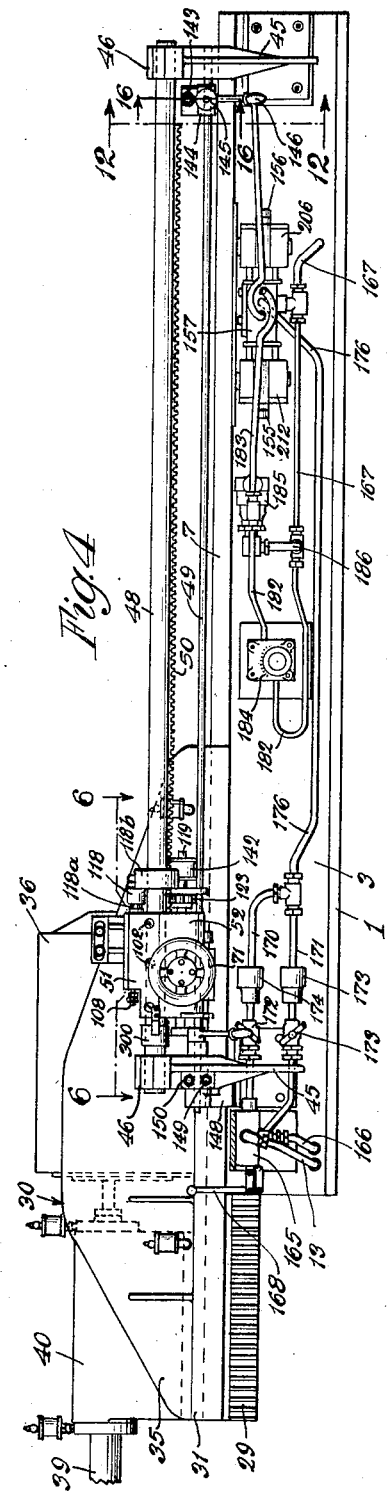
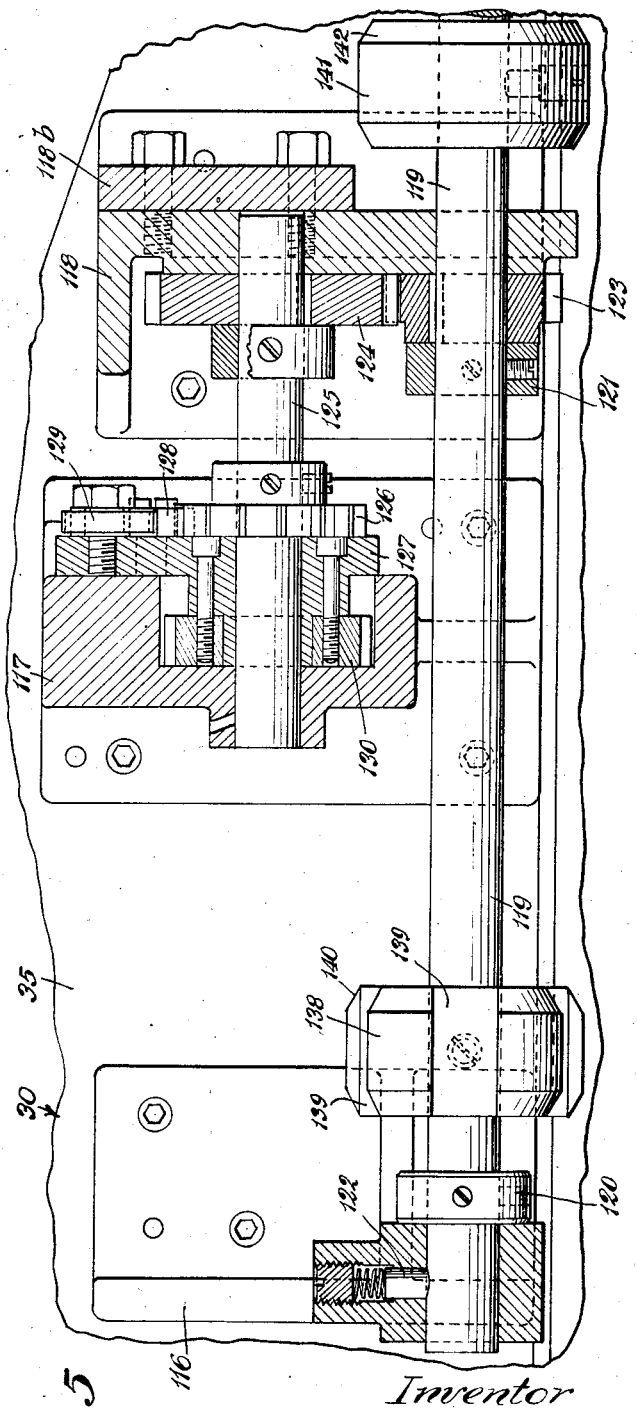
Inventor
Richard E. Barr
by Parker & Carter
Attorneys July 15, 1947.  R. E. BARR  2,424,138
WOODPECKER DRILL
Filed Sept. 27, 1943  11 Sheets-Sheet 5
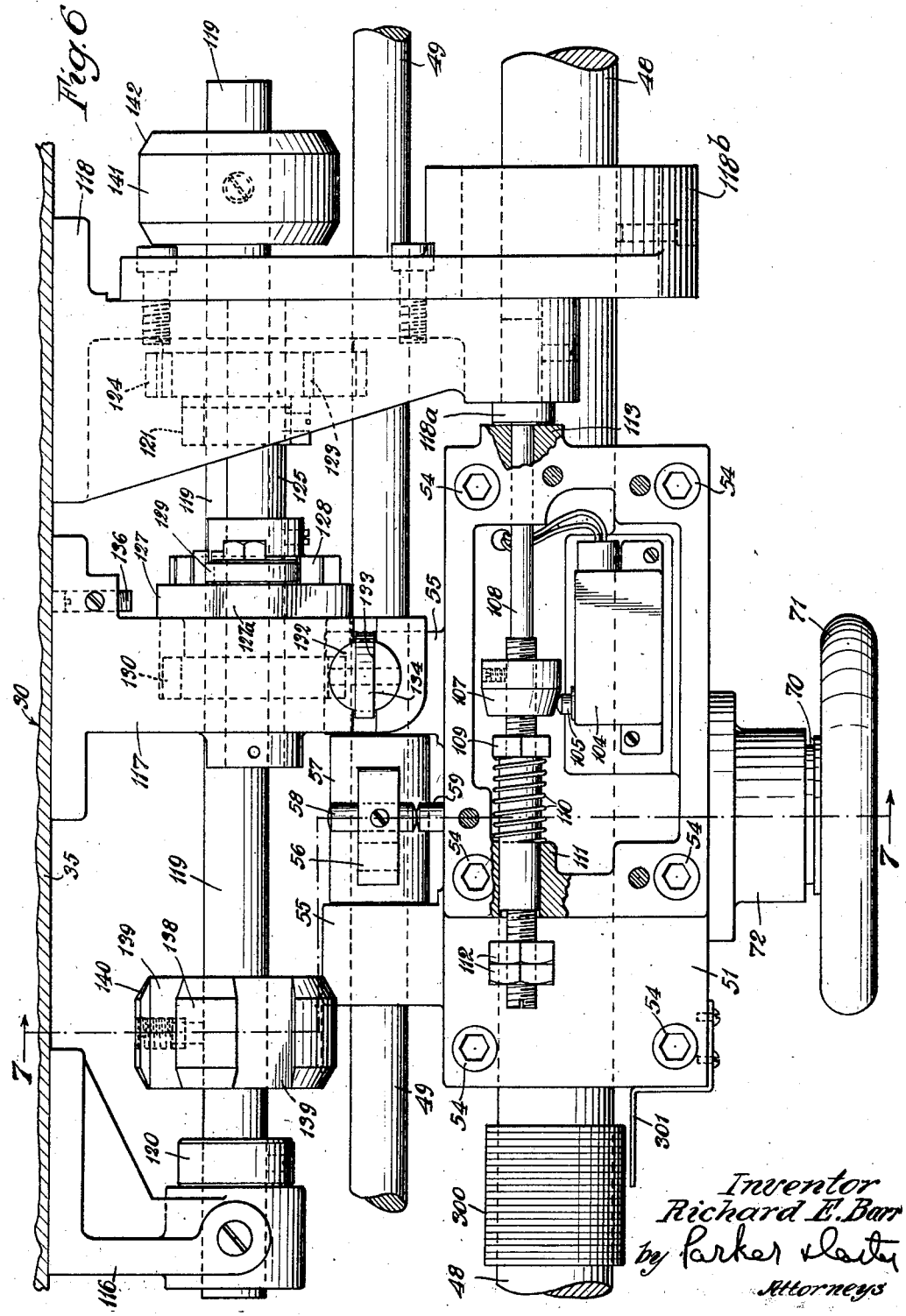

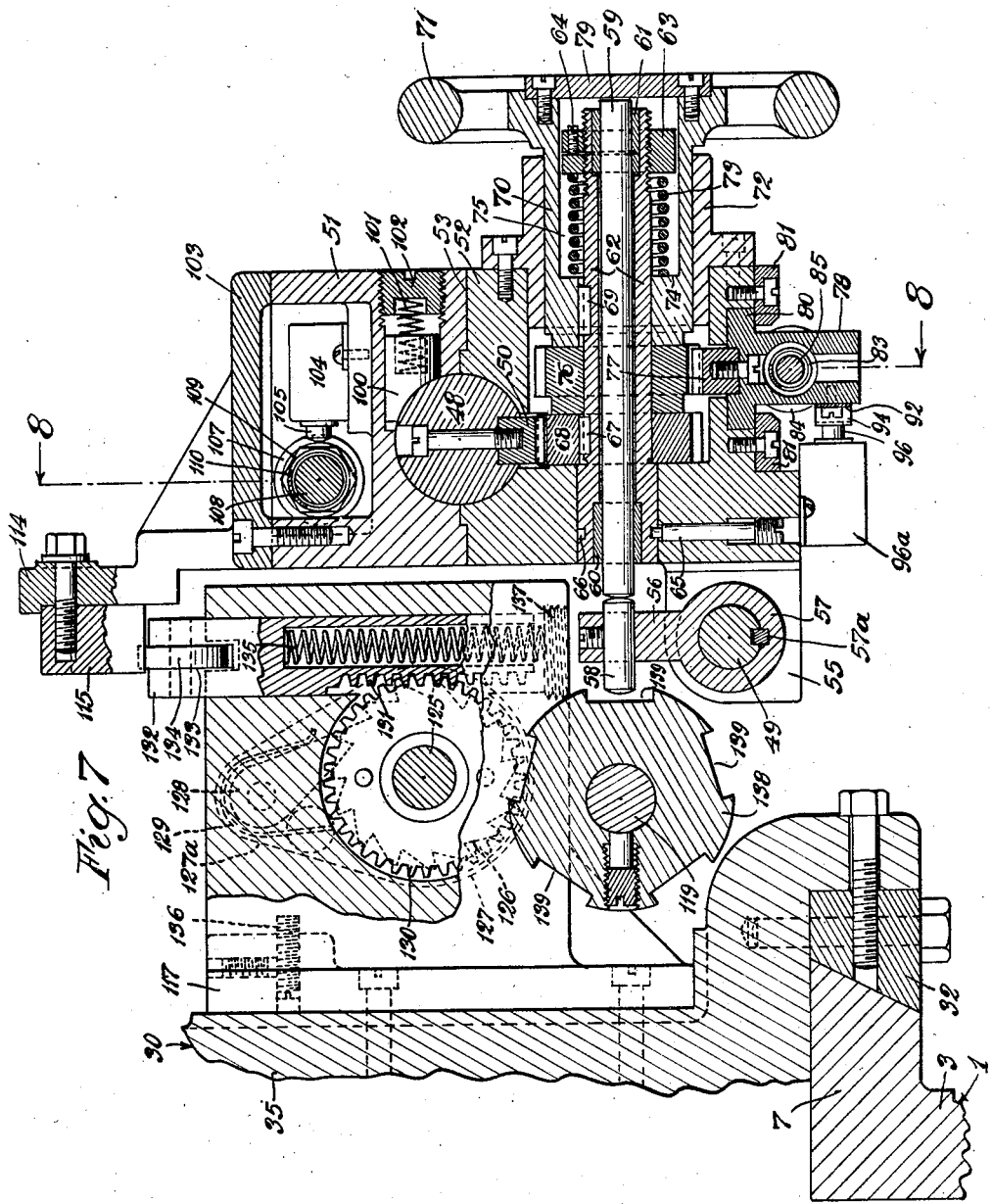

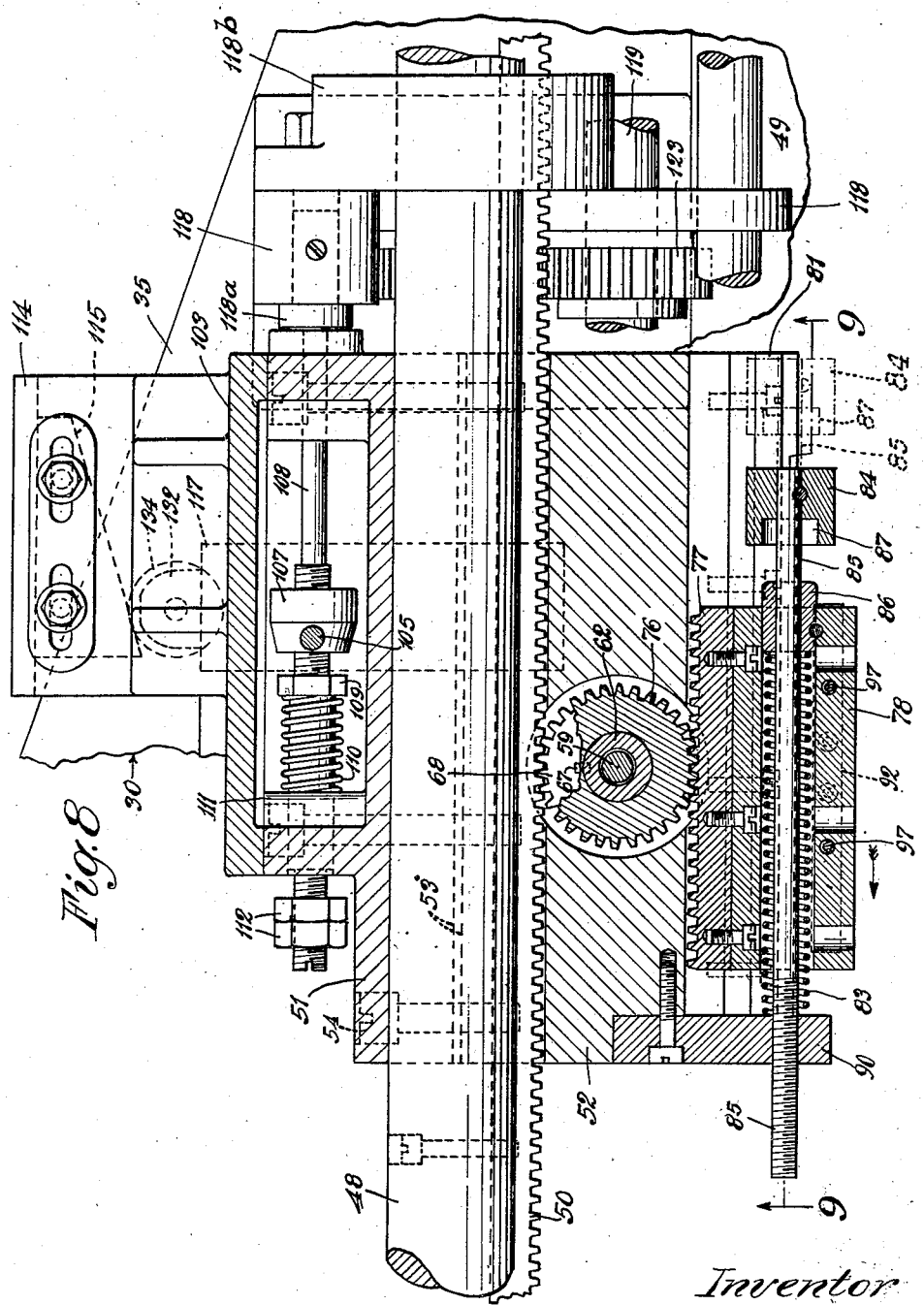

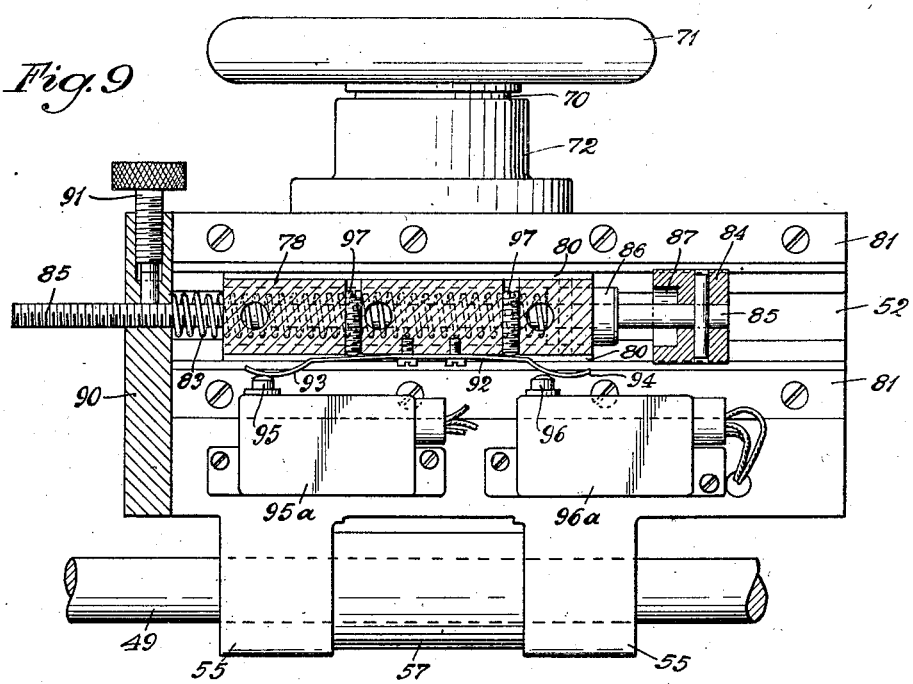
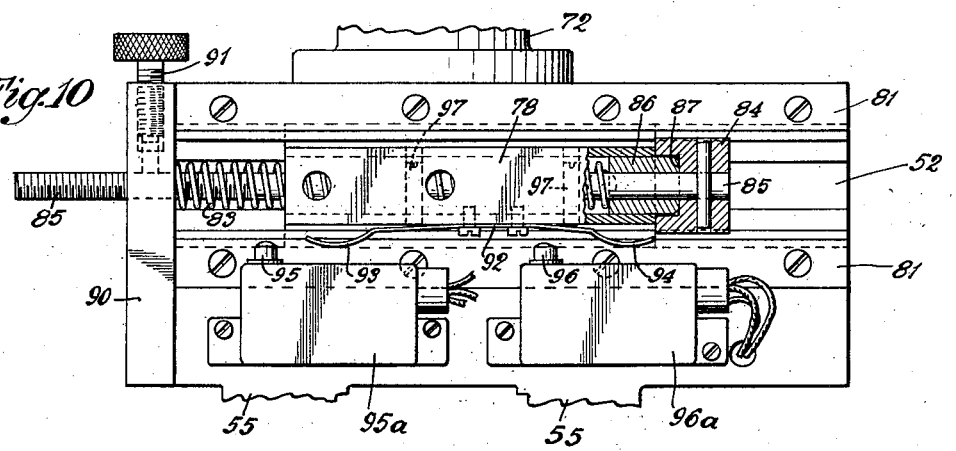
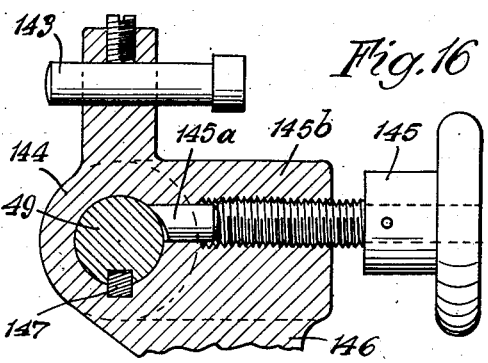

July 15, 1947.   R. E. BARR   2,424,138
WOODPECKER DRILL
Filed Sept. 27, 1943   11 Sheets-Sheet 9
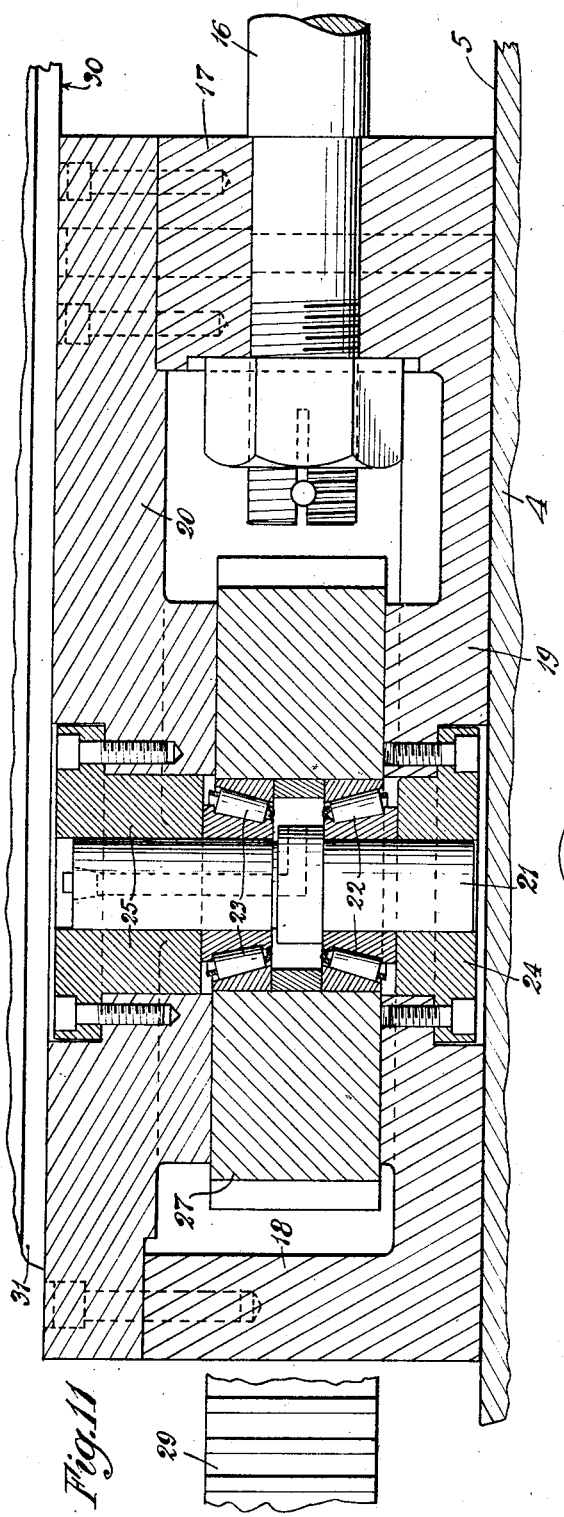
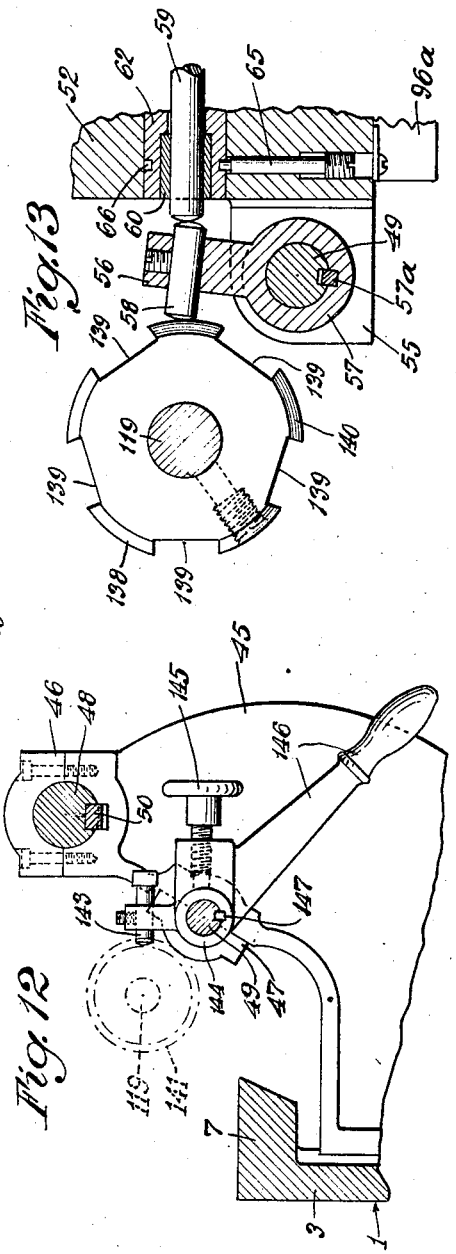
Inventor
Richard E. Barr
by Parker & Carter
Attorneys

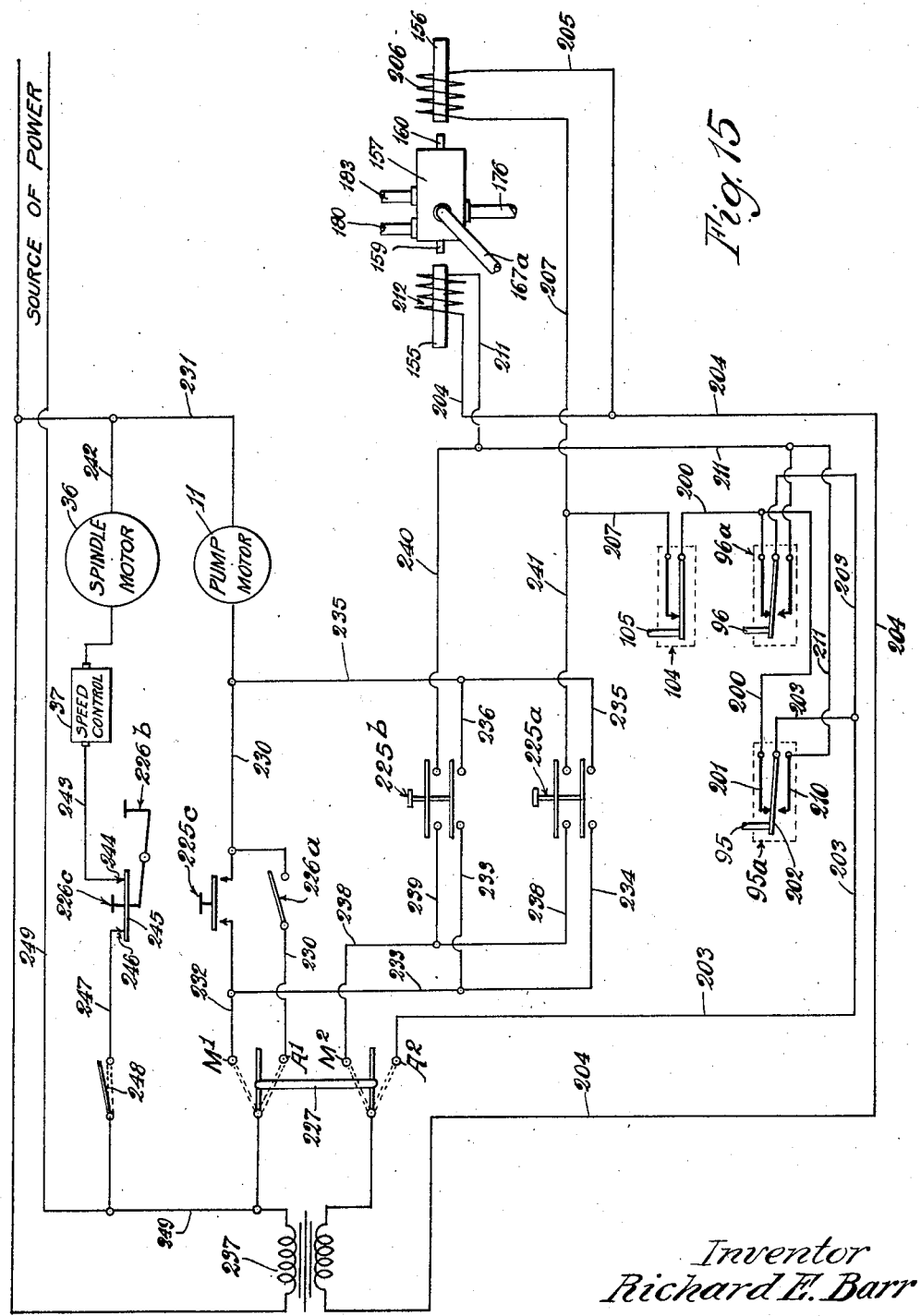

Patented July 15, 1947

2,424,138

UNITED STATES PATENT OFFICE 2,424,138

WOODPECKER DRILL

Richard E. Barr, Milwaukee, Wis., assignor to Nordberg Manufacturing Company, Milwaukee, Wis., a corporation of Wisconsin Application September 27, 1943, Serial No. 503,884

4 Claims. (Cl. 60—52)

This invention relates to an improvement in drills and has for its general purpose to provide an improved deep drill.

One purpose is to provide a drill which may at choice be either manually or automatically controlled.

Another purpose is to provide an improved control for drills and the like which is effective to move a drill into and out of the work in a predetermined controllable automatic cycle.

Another purpose is to provide means for automatically imparting to a drill, in alternate succession, a short back stroke and a long back stroke, in order to withdraw chips and shavings.

Another purpose is to provide improved motive means for controlling drill carriages and the like.

Another purpose is to provide an improved hydraulic controlled cycle for drills and the like.

Another purpose is to provide improved means for providing delicate closely adjustable manual control for the drill when desired.

Other purposes will appear from time to time in the course of the specification and claims.

The invention is illustrated more or less diagrammatically in the accompanying drawings, wherein:

Figure 4 is a section taken along the line 4—4 of Figure 2;

Figure 5 is a section along the line 5—5 of Figure 3 on an enlarged scale;

Figure 6 is a section on an enlarged scale along the line 6—6 of Figure 4;

Figure 7 is a vertical section along the line 7—7 of Figure 6;

Figure 8 is a section along the line 8—8 of Figure 7;

Figure 9 is a section along the line 9—9 of Figure 8;

Figure 10 is a similar view with parts in a different position;

Figure 11 is a section on an enlarged scale along the line 11—11 of Figure 3;

Figure 12 is a section on an enlarged scale along the line 12—12 of Figure 4;

Figure 13 is a partial section similar to Figure 7 with the parts in different positions;

Figure 15 is a wiring diagram;

Figure 16 is an enlarged section taken on line 16—16 of Figure 4.

Like parts are indicated by like characters throughout the specification and drawings.

Figure 1:
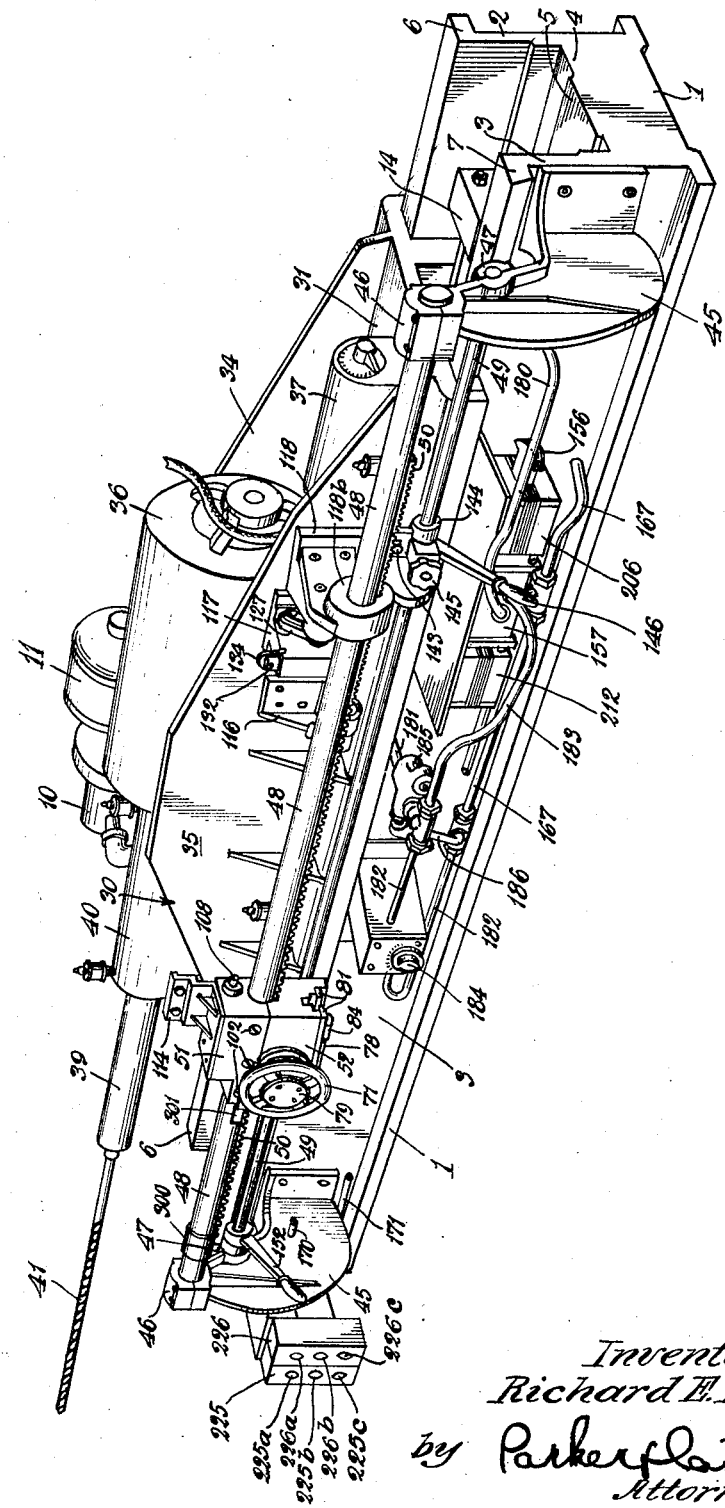
Figure 1 is a perspective view with parts broken away.

Referring to the drawings, 1 generally indicates any suitable machine base including longitudinal side members 2 and 3 and a transverse intermediate member 4, having a slightly raised generally horizontal plane bearing surface 5. The members 2 and 3 have upper outwardly extending flanges 6 and 7. Secured to or forming part of the base is a side extension generally indicated as 8 upon which is mounted any suitable tank 9 for a hydraulic medium.

10 generally indicates a pump and 11 any suitable motor therefor. The pump intake is shown as at 12. 13 indicates a delivery pipe from the pump. The connections for the pump and the hydraulic circuit will later be described in detail.

Figure 3:
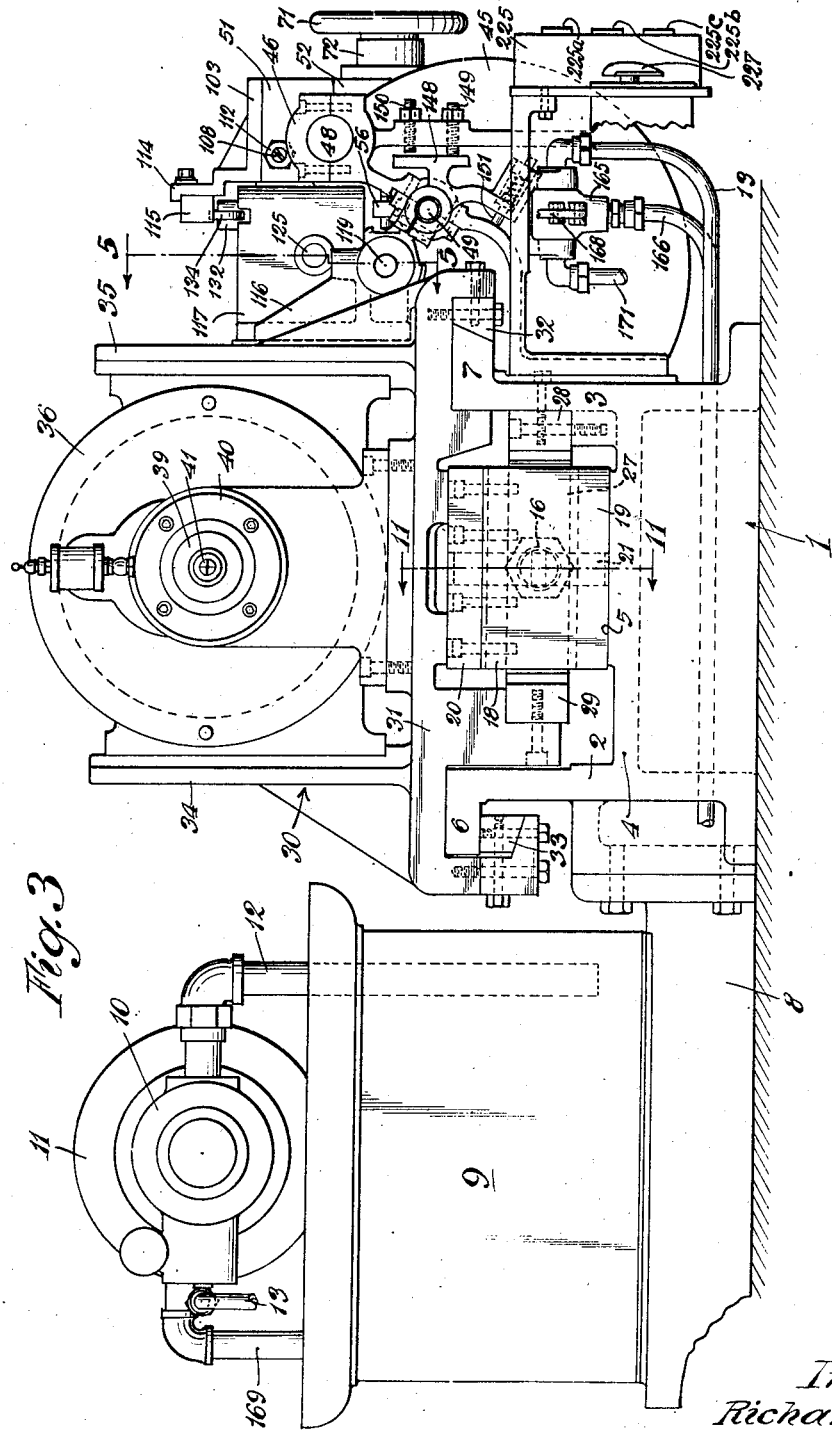
Figure 3 is a front end elevation on an enlarged scale.

Fixed on the base 1 is the cylinder 14. The hydraulic connections for this cylinder will later be described in detail. Within it is any suitable piston 15 connected to the piston rod 16. Connected to the piston rod 16 is any suitable block structure shown in some detail in Figure 11. It includes end portions 17 and 18 connected by a bottom portion 19. 20 indicates a top plate. Mounted between the bottom and top plates 19 and 20 is a fixed shaft 21 surrounded by oppositely tapered roller bearings 22 and 23. 24 and 25 indicate retaining blocks for centering and retaining the shaft. The outer races of the bearing structures 22 and 23 carry a gear 27. This gear is in mesh at one side with the fixed rack 28 on the base and shown for example on the side wall of the member 3 as shown in Figure 3. The gear 27 meshes also with a rack 29 fixed to the spindle carriage generally indicated as 30. Any suitable bearing and guiding means may be employed, the carriage 30 including a plate 31 resting on the upper flanges 6 and 7 of the side members 2 and 3.

32 and 33 indicate guiding and retaining members. It will be understood that in response to the forward movement of the piston rod 16 the spindle carriage 30 will move twice as far as the piston rod and its block. The spindle carriage 30 is provided with upstanding flanges 34, 35 between which may be mounted any suitable spindle motor 36. It will be understood that any suitable spindle motor may be employed and any suitable speed control. I may for example employ a motor with four speeds of rotation, any suitable control means being provided and being shown diagrammatically at 37.

38 is any suitable motor shaft or motor connection effective to drive the spindle generally indicated as 39 which is rotatably mounted in any suitable bearing structure 40. The spindle itself may carry any suitable drill 41 as shown in Figure 1.

Mounted at each end of the wall 3 of the base 1 is a bracket 45 carrying any suitable split shaft receiving sleeves 46 and 47 which receive shafts 48 and 49. The shaft 48 is fixed. The shaft 49 is rotatable about its axis through a limited arc. Positioned on the bottom of the shaft 48 and fixed in relation thereto is a rack 50 which extends substantially from end to end of the shaft.

Movable along the shaft 48 is the control or "firing" mechanism which, as will later appear, determines the cycle of movement of the drill. It is shown in considerable detail in Figures 6 and 10 inclusive. It includes a block having an upper portion 51 and a lower portion 52, the blocks being shown as abutting along the surface 53 in Figure 7, the two blocks being secured together for example by screws or other suitable securing means 54, about the shaft 48 as shown in Figures 7 and 8. Extending laterally from the lower part 52 are a pair of bearing elements 55 which surround the shaft 49, whereby rotation of the control box is prevented. The box, however, is slidable along the shafts 48 and 49. Extending upwardly from the shaft 49 and surrounding it and positioned between the bearing members 55 is a lever 56 which is provided with a sleeve portion 57 which carries the feather key 57a which penetrates a slot extending the length of the shaft 49. Thus the lever 56 moves along the shaft 49 in unison with the control box but is held against rotation in relation to the shaft 49. The lever 56 carries secured therein an actuating pin 58, one end of which is opposed to a sliding pin or rod 59 mounted in the member 52. The rod 59 is slidably mounted in bearing elements 60, 61, in a sleeve 62. The sleeve 62 is provided with an abutment nut 63 screw threaded to its outer end, and held in position by the lock screw 64. Endwise movement of the sleeve 62 is prevented by any suitable means for example the retaining screw 65 which penetrates the circumferential slot 66. The sleeve 62 carries a key 67 which secures a gear 68 in mesh with the rack 50.

The feather key 69 connects the sleeve 62 with the hub 70 of the hand wheel 71. The hub is mounted in a bearing 72 secured to the member 52. The spring 73 is normally compressed between the inner end 74 of the bore 75, and the nut 63, and normally tends to urge the sleeve 70 inwardly against a loose gear 76 which is thereby kept in frictional engagement with the gear 68. The gear 76 is in mesh with the rack 77 mounted on the switch block 78. Note that the hand wheel 71 has an end plate 79 which is engaged by the pin 59 when the pin is pressed to the right, referring to the position of the parts as shown in Figure 7. When the pin is thus thrust to the right, the hand wheel and the hub 70 move to the right and the frictional engagement between the gears 76 and 68 is thereby broken. The switch block 78 is provided with upper flanges 80 which seat upon guiding and supporting members 81, secured to the member 52. It will be noted that the flanges 80 slide in a groove in the bottom of the member 52. When the gears 76 and 68 are in frictional contact, the engagement between the gear 68 and the rack 50 is effective to rotate the gear 76 and thus to advance the member 78 in the direction of the arrow in Figure 8. When the rod 59 is moved to the right, referring to the position of the parts in Figure 7, the connection between the gears 76 and 68 is broken and the spring 83 is effective to return the block 78 toward the right, referring to the position of the parts in Figure 8, so far as the stop 84 on the adjustable rod 85 will permit. The rod 85 passes through a bore in the block 78 and through a sleeve 86 which extends outwardly from the end of the block 78. It will be noted that the stop 84 is provided with a bore 87 which receives the extending end of the member 86 with a dash pot action. The parts are shown in closed position in Figure 10. It will be noted that the rod 85 is screw threaded in a block 90 secured to the lower member 52 which may be locked in adjusted position by any suitable locking means 91.

Associated with the block 78 is the switch structure generally indicated in Figures 9 and 10. This structure includes a double spring 92 having spring finger ends 93, 94. Referring to Figure 9, it will be noted that the spring finger 93 is opposed to a spring button 95 of any suitable micro-switch 95a. A second switch button 96 is provided, connected with a second micro-switch 96a in order to insure switch action in case the first switch fails. Details of the switches do not form part of the invention and are not herein indicated. It will be noted that the flexure of the members 93 and 94 may be adjusted by any suitable adjusting screws 97.

Referring to the upper member 51, friction blocks 100 are provided, spring thrust as by springs 101 against the shaft and controlled by adjusting screws 102, in order to vary the frictional resistance between the control block and the shaft 48.

Located within the member 51 and beneath the removable cover plate 103 is a micro-switch generally indicated as 104 and having a projecting button 105. The switch is actuated by the cam plunger 107 mounted on the push rod 108 which is provided with an abutment 109 opposed to the spring 110 pressing against the fixed abutment 111. 112 indicates any suitable adjustable abutment for limiting the movement of the rod structure to the right, referring to the position of the parts in Figure 6. When the parts are in the position of Figure 1, the spring 110 is effective to move the rod 108 as far as the abutment 112 will permit. The end of the rod 108 then projects outwardly beyond the boss 113.

The cover plate 103 carries an upward projection 114 which has adjustably mounted thereon, the cam member 115.

Movable with the spindle carriage 31 and secured to the side wall 35 thereof, is the structure shown in Figure 5 in the upper half of Figure 6 and the left half of Figure 7. Outwardly extending from the wall 35 are three brackets 116, 117, 118. Rotatably mounted in the three brackets is the shaft 119. Endwise movement of the shaft is prevented, for example, by the collars 120, 121. 122 indicates a frictional button, spring thrust against the shaft 119 and adapted to frictionally resist rotation of the shaft. Keyed to the shaft 119 is a gear 123 in mesh with a gear 124 on a shaft 125 rotatably mounted in the brackets 117 and 118. 126 is a ratchet gear locked on the shaft 125. Rotatable about the shaft 125 is the dog supporting element 127 which carries the dog 128 opposed to the ratchet gear 126. 129 is a spring effective to urge the dog in to operative position. Secured to the member 127 is the gear 130, in mesh with the teeth 131 of the vertically guided plunger 132. This plunger is slotted at the top as at 133 to receive the roller 134 adapted to be opposed to the cam 115 on the cover plate of the control member 51, 52. Normally the spring 135 urges the plunger 132 upwardly. Any suitable stop means may be employed for limiting its movement. I illustrate for example the adjustable stop 136 adapted to engage the outwardly extending portion 127a of the dog supporting member 127, in response to its counter-clockwise rotation, referring to the position of the parts in Figure 7. 137 is any suitable bottom abutment for the spring 135.

Locked on the shaft 119 is an interrupted cam body 138 provided with five interruptions 139 as shown for example in Figure 7. The cam portions between the interruptions are beveled as at 140. Adjacent the opposite end of the shaft 119 is another cam body 141 with its tapered surfaces 142. The cam body 141 engages the adjustable button 143 on the stop member 144 mounted on the shaft 49. The stop member may be adjustably locked on the shaft 49 as by member 145a operated by the hand screw 145 threaded in boss 145b. On the shaft 49 is a handle 146, for manual rotary oscillation of the shaft through its permitted arc. A key 147 associated with the member 144 and penetrating a slot in the shaft 49 keeps the parts in proper relation with the shaft.

At the opposite end of the shaft 49 is a second manual control lever 152, for manual rotary oscillation of the shaft 49. Fixed on the end of the shaft 49 is a limit plate 148 which permits a total arc of oscillation of the shaft 49 limited by the two adjustable limit elements 149 and 150 on the bracket 45. 151 is a spring thrust plunger tending normally to move the plate 148 counter-clockwise into the position shown in Figure 3 and with it the shaft 49 and its associated parts.

Figure 2:
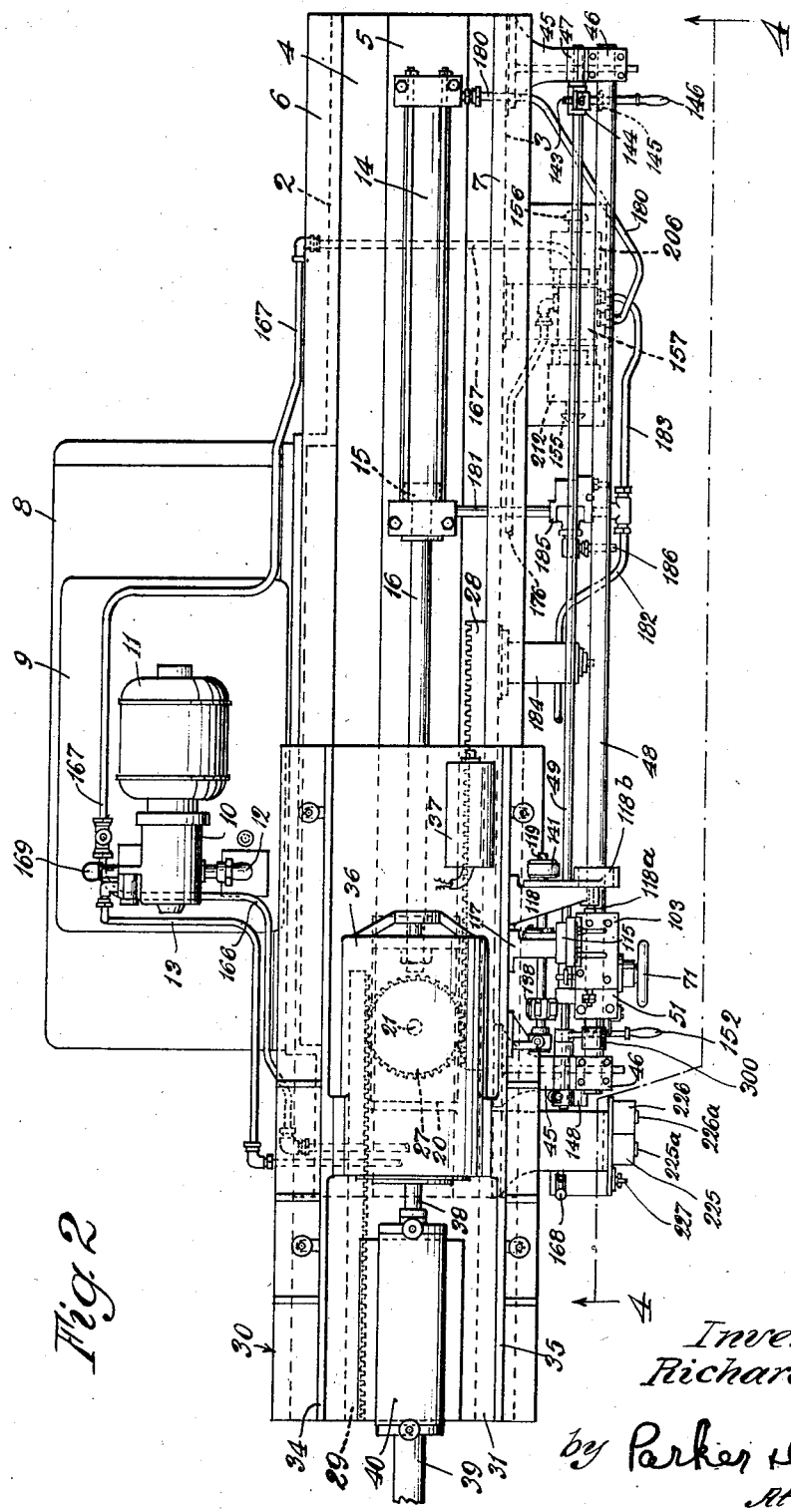
Figure 2 is a plan view with the parts in a different position.

The hydraulic control circuit, which is described below, is controlled by a three-position valve actuated by a pair of solenoids, the plungers of which are indicated at 155 and 156, for example in Figures 2 and 14. 157 indicates a valve housing in which is endwise movable a valve stem 158 having an exposed end 159 opposed to the solenoid plunger 155, and an opposite exposed end 160 opposed to the solenoid plunger 156. The spring 161 is employed to bias the plunger 158 normally to the intermediate position in which it is shown in Figure 14.

Figure 14:
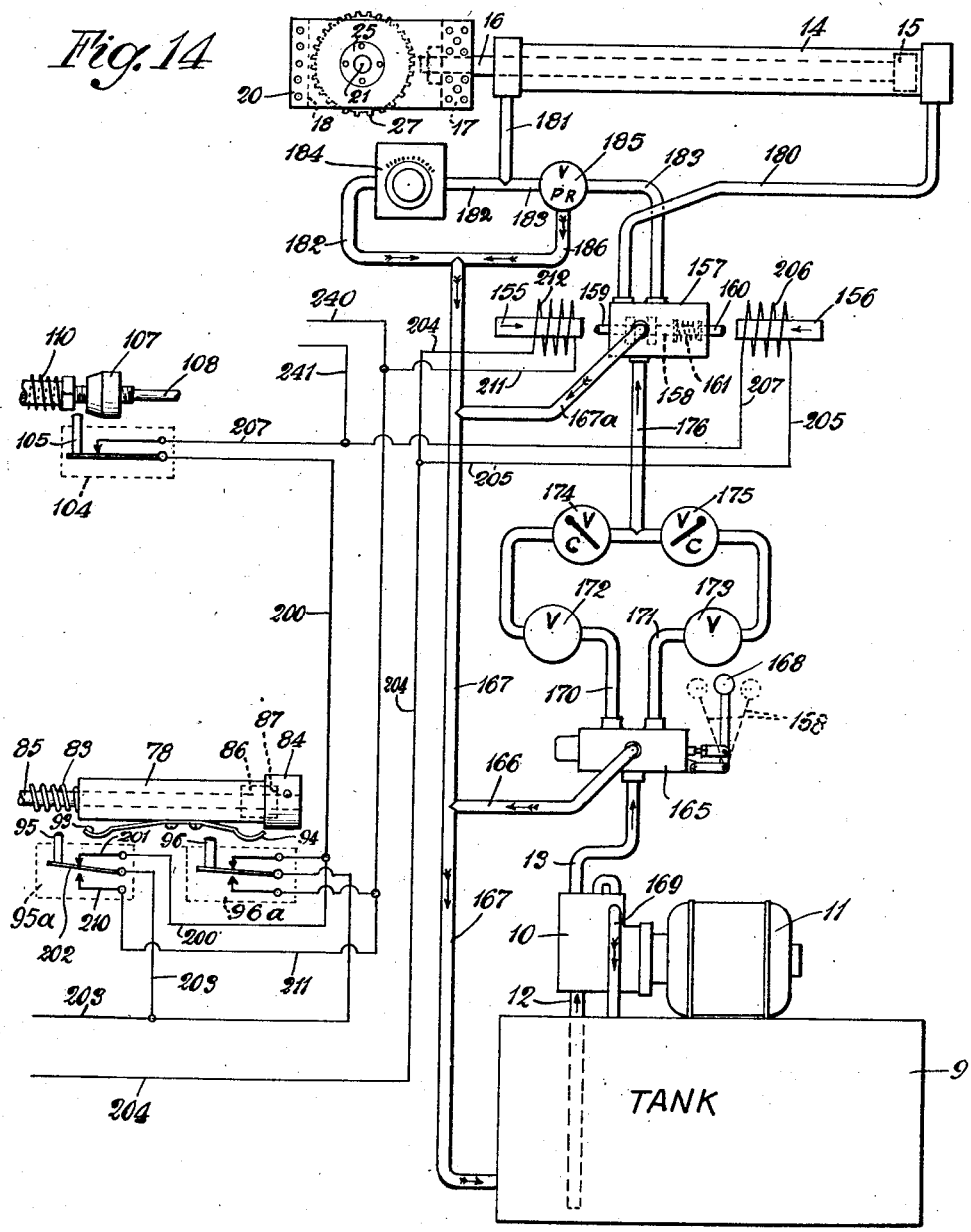
Figure 14 is a diagram of the hydraulic circuit and associated electrical control means.

The circuit will best be understood in connection with the more or less diagrammatic showing of Figure 14. The circuit includes the already described tank 9 from which the liquid is withdrawn along a pipe 12 by the pump 10 actuated by the motor 11 which in turn delivers the fluid along the pipe 13 to the lever operated four-way valve generally indicated at 165. The by-pass passage 166 extends to the general return passage 167 which leads back to the tank. The valve, the interior parts of which are not shown as they do not of themselves form part of the present invention, is controlled by the valve handle lever 168. When the lever 168 is in the full line position of Figure 14, no fluid is passing beyond the valve 165 and the pump is merely pumping in closed circuit, the fluid passing from the pipe 13 to the pipe 166 and thence to the return passage 167. The pump is also provided with a safety by-pass passage 169.

Extending from the valve housing 165 are two outlet passages 170, 171, controlled by any suitable needle valves 172, 173, and check valves 174, 175. The passages 170, 171 unite in the unitary delivery passage 176 which extends to the three-position valve or solenoid control valve 157. It will be understood that by varying the setting of needle valves 172 and 173, a choice of speeds is provided, controlled by the movement of the lever 168 either to the right or to the left from the central full line position in which it is shown in Figure 14. For example, the valve 172 can be set to provide a very small flow of liquid and thus a very slow feed. In that event, the valve 173 may be set to provide a normal feed or speed. By manipulating the valve 168, the user may prevent any feed along the pipe 176 or may permit a very slow rate of flow or a considerably faster rate of flow.

180 is a feed pipe extending from the valve housing 157 to one end of the cylinder 14. This pipe may be employed, in response to proper setting of the lever handle 168, to deliver fluid effective to thrust against the piston 15 and thus advance the rod 16 which in turn moves the spindle carriage to the left, referring to the position of the parts as shown in Figures 2 and 14. The spindle carriage is thereby advanced toward the work. This advance is at a normal, relatively rapid rate, or at a very slow rate, depending upon whether the lever 168 is moved into its right or its left hand dotted line position.

181 indicates a return pipe from the opposite end of the cylinder 14. It is shown as branching at 182, 183. In the branch 182 is located any suitable metering valve 184. The branch 182, as will be clear from Figure 14, extends to the return pipe 167 to the tank 9. In the opposite branch 183 is located any suitable pressure relief valve 185. The branch 183 is shown as extending to the valve housing 157. 186 is a pipe extending from the pressure relief valve to the return pipe 167.

In Figure 14, I indicate that part of an electrical circuit which includes the control of the solenoid plungers 155 and 156, the circuit as a whole being illustrated in Figure 15. Note that the micro switch 104 which is controlled through the button 105 by the cam 107 is in series with the double micro switch 95a controlled by the button 95. The circuit may be traced through the wire 200 to the contact 201, through the movable switch 202, to the line 203 to any suitable source of power. The return circuit follows the line 204, 205 through the solenoid coil 206 and the line 207 to the opposite pole of the micro switch 104. The switch 104 is normally in the closed position in which it is shown in Figure 14 and the switch 95a as normally in the position in which it is shown in Figure 14.

The lower contact 210 of the micro switch 95a is connected by a line 211 with the coil 212 for the solenoid plunger 155, the coil 212 being connected to the line 204. With reference to the diagram, it will be understood that the second micro switch 96a is the duplicate of the switch 95a and is merely employed for safety in case the micro switch 95a fails to function.

The above described structure is adapted for both manual and automatic operation. I illustrate two control boxes 225, 226, the first adapted for manual and the second for automatic control. In each of these boxes is illustrated three push buttons or control members 225a, 225b, 225c and 226a, 226b, 226c. 227 diagrammatically indicates a control switch, shown also in the wiring diagram, Figure 15, for determining whether the automatic or manual control system is effective.

In Figure 15, the double pole switch 227 is shown in full line or neutral position, the machine being at that time out of action. If the switch is moved to the contacts indicated as M1 and M2, the device is set for manual operation. If the poles of the switch 227 contact the members A1 and A2, the device is set for automatic operation. With reference to Figure 15, note that a conductive line 230 extends from the contact A1 through the switch 226a to the pump motor 11. Line 231 extends from the pump motor 11 to the source of power. 232 is a line from the contact M1 in parallel with the line 230 and includes the switch 225c. 233 is a branch line from the line 232 which branches as at 234. The line 233 is in contact with one pole of the two pole switch 225b and the line 234 is in contact with one pole of the double contact switch 225a. These contacts in turn are connected by the line 235 and the branch 236 with the line 230.

237 is any suitable transformer, the secondary coil of which supplies current to the solenoid coils 212 and 206 on the lines 204, 205.

The contact M2 is connected by the conductive line 238 and the branch 239 with the second set of poles of the switches 225a and 225b. The opposite pole of the switch 225b is connected by the line 240 with the solenoid coil 212 through the line 211. The opposite contact of the second pole of the switch 225a is connected by the conductive lines 241 and 207 with the solenoid coil 206. For convenience I employ the same identifying number for the push buttons and the switches controlled thereby.

A2 is connected by the conductive line 203 with the above described micro switches 95a and 96a.

The spindle motor 36 is in circuit with a source of power through the lines 231, 242, speed control 37, the line 243, contact point 244, switch plate 245, contact 246, line 247, master switch 248 and the line 249.

Assume that the selector switch 227 is moved to the manual control position, with its poles in contact with the contacts M1 and M2, the switch buttons and switches 225a, 225b, 225c are then in circuit. The switch 225a when manually operated, causes the rapid forward movement of the spindle carriage toward the work. The switch 225b when manually operated, causes the rapid recession of the spindle and spindle carriage from the work. The switch 225c may be employed for a slow forward feeding movement.

By switching the control switch 227 to the automatic position, the buttons and switches 226a, 226b, 226c are made ready for operation. The spindle circuit must first be closed by pressing the button 226b which closes the switch plate 245 with its opposed contacts. Thereafter the pump motor is put into operation by pressing the button 226a which controls the like numbered switch. Thereafter the automatic cycle below described in greater detail will be initiated, subject however to the control of the handle 168 operating the valve 165. The button 226c is a spindle stop control which, when pressed, moves the switch plate 245 to circuit breaking position. This automatic cycle includes a rapid initial movement of the spindle toward the work; a slow feed forward, during the period that the drill is in contact with the work, and a rapid rearward movement at the end of a predetermined length of slow forward feed. The rearward movement is alternately through a long and a short stroke, and ends in a subsequent rapid forward feed.

It will be realized that whereas I have shown and described an operative device, still many changes may be made in the size, shape, arrangement, number and disposition of parts without departing materially from the spirit of my invention. I wish, therefore, that my showing be taken as in a large sense diagrammatic, rather than illustrative.

The use and operation of the invention are as follows:

I provide a deep drilling mechanism in which a spindle carriage, supporting a spindle and spindle motor and operating any suitable drill member, is moved toward and away from the work, in a cycle which may be completely automatic, or may be manually controlled or interrupted. In initial setting and even in finishing certain types or stages of drilling, it is advantageous to maintain a completely manual control. In that event, the selector switch 227 is set to the manual position as above described. After the initial manual adjustment has been made and the drill element has been advanced to a proper setting in relation to the work, I may, if desired, continue the drilling from then on in an automatic cycle.

In the particular embodiment and setting of the device herein shown, the automatic cycle includes a rapid forward feed toward the work, which terminates in a short, slow feed, during which the drilling actually takes place. At the end of the short slow feed, there is a rapid return stroke, which may be at practically the same speed as the rapid forward stroke. At the end of the return stroke, a rapid forward stroke again takes places, terminating again in a slow forward drilling stroke. The return strokes may be alternately long and short. It will be understood that each slow forward drilling stroke starts in advance of or further toward the work than the preceding short slow forward drilling stroke. The slow movement in each case preferably starts just before the drill member actually contacts the undrilled work. The "pattern" of short and long strokes can be omitted or varied by omitting or fixing the cam 138, or by changing the arrangement of grooves 139 therein.

It will be understood that any suitable jig may be employed for guiding and centering the drill. The long return stroke should be of insufficient length to withdraw the drill completely from the jig.

The automatic sequence can always be changed or cut out by manual actuation of the trip rod 49 by the handles 146 or 152.

The general sequence and mode of operation will be understood in connection with the schematic showing of Figure 14. The solenoid plungers 155 and 156 cooperate in controlling the valve stem 158. When the coil 206 is energized, the plunger 156 moves the valve stem 158 to the left, referring to the position of the parts as shown in Figure 14. The result is the passage of fluid through the pipe 176 in the direction of the arrow, through the valve housing 157, and the pipe 180, to the advancing or right hand end of the cylinder 14, referring to the parts as shown in Figure 14. The back flow from the opposite side of the piston 15 flows back through the return pipe 181, the pipe 183, the valve housing 157 and the pipe 167a, and thence back to the pipe 167 and the tank 9. The result is a rapid forward feed of the spindle carriage.

Upon deenergization of the coil 206, the spring 161 returns the valve stem 158 to the intermediate position in which it is shown in Figure 14. This breaks the return connection between the pipe 183 and the pipe 167a. The return flow of fluid from the pipe 181 then passes through the pipe 182 and is controlled by the metering valve 184 which may be set to control the flow of liquid to permit a relatively slow advance of the piston 15 and thus of the spindle carriage. The feed flow is still through the pipe 176, the valve housing 157 and the pipe 180. Fluid is still being delivered to the right hand end of the piston 15, referring to the position of the parts in Figure 14, but the return flow from the opposite side of the piston is diverted and must flow past the metering valve 184.

When the coil 212 is energized, the plunger 155 moves the valve stem 158 toward the right. The direction of flow is then reversed and the fluid is delivered through the pipe 176, the valve housing 157 and the pipe 183 to the pipe 181. The result is to move the piston 15 toward the right, referring to the position of the parts in which they are shown in Figure 14. The return then flows from the right hand side of the piston 15 through the pipe 180, the valve housing 157 and the pipe 167a back to the pipe 167 and thus to the tank 9.

This governing mechanism is controlled, during automatic operation, by the earlier described control or "firing" mechanism which includes the single micro switch 104 and one or another of the two-pole micro switches 95a, 96a. All of these switches are located on the firing mechanism shown for example in Figure 6. It will be understood, of course, that when the selector switch 227 is moved to the manual operation position as shown in Figure 15, the energization of the coils 206 and 212 is controlled by the manual control buttons and associated switches 225a, 225b.

To give a typical example of the use of the device, the selector switch 227 is first switched to the manual position. The "firing" mechanism, including the housing members 51, 52, is moved toward the feed end of the rod 48 on which it rides. The valve control 168 is set at the desired position for controlling the maximum speed. Then the operator may press the fast feed button 225a, which is effective to energize the coil 206 and cause the plunger 156 to move the valve stem 158 to the rapid forward feed position. At the same time the circuit is closed through the pump motor through the line 233, 234 and 235, as shown in Figure 15. The result is a rapid forward movement of the piston 15, and the spindle carriage. As soon as the operator relieves the pressure on the button 225a, the circuit through the pump motor is broken and no further forward feed takes place, although the valve stem 158 has been moved by spring 161 to the slow forward speed position. For the final adjustment, the slow feed button 225c is employed, which closes the circuit for the pump motor without changing the setting of the valve stem 158. The forward movement of the firing unit toward the work may be gauged by employment of the movable gauge ring 300, which is slidable on the rod 48 and to which is opposed any suitable pointing member 301 on the firing unit. The firing unit is set at the point where the automatic slow forward feed is to begin. The wheel 71 may be employed to set the firing unit at the desired point. The adjusting lever collar 144 is adjusted or set by the lock wheel at the point along the rod 49 necessary to limit the withdrawal of the drill from whatever jig is employed. The firing unit is set to operate to cause the slow forward drilling feed to begin just before the drill contacts the undrilled work.

Assume that the drill 41 has been manually advanced, as above set out, to the proper position and that the firing unit 51, 52 and the member 144 have been properly set. Then the switch 227 may be shifted to automatic operation. It will be understood, also, that the manual button 225b can be employed to withdraw the drill in case it has been too far advanced, but only if the switch 227 is in position to close the contacts M¹, M² of Figure 15.

Assume that the selector switch 227 is moved to the automatic position. The circuit for the spindle motor is first closed by actuation of the switch 226b. The pump motor circuit is then closed by closure of the switch 226a. The lever 168, which is initially in the closed position, is moved to the desired speed position. The automatic cycle then starts. The spindle carriage moves forward and carries with it the bracket 118, the contact element 118a which engages the rod 108 of the firing mechanism and moves it toward the left, referring to the position of the parts as shown in Figure 6. Just before the member 118a touches the boss 113, the cam 107 opens the switch 104 by engaging a button 105. This breaks the circuit through the solenoid coil 206 and limits the rapid forward movement of the spindle carriage. The switches 104 and 95a are normally closed, and the valve stem 158 is initially held by the plunger 156 in the rapid forward feed position. This rapid forward feed, however, is limited by the engagement of the cam 107 with the switch button 105, and thereafter only the slow forward feed which carries the drill for the actual drilling operation is possible. This slow speed drilling excursion is controlled and ended as follows:

The firing mechanism, including the members 51 and 52, moves in unison with the spindle carriage during the slow feed, being pushed by the bracket 118. The gear 68, shown in Figure 7, which moves in unison with the gear 76 of Figure 8, is in mesh with the rack 50 fixed on the rod 48. As the firing mechanism moves along the rod 48, the gear 76 is effective to move the rack 77 in relation to the firing unit. The eventual result of the forward movement of the associated element 78 is to actuate the switch 95a by means of the spring finger 93, to close a circuit through the solenoid coil 212. This moves the solenoid plunger 155 to urge the valve stem 158 to the rapid rear feed position. The slow forward speed ends, and the drill spindle and the drill rapidly recede from the work. This recession continues until the cam 141 contacts the pin 143, which turns the shaft 49, forcing the pin 58 to contact the shaft 59 and disconnect the frictional contact of the gears 68 and 76. This permits the spring 83 to shift the block 78 to the right, referring to the position of the parts as shown in Figure 8 and to reestablish a switch contact at 95a as shown in Figures 14 and 15. This terminates the backward movement of the drill spindle, which thereupon moves rapidly toward the work.

As above described, the mechanism as herein shown, will provide alternately a short rearward excursion and a long rearward excursion. Consider first the short stroke, and assume that the cam 138 is set in the position in which it is shown in Figure 13. The cam moves unitarily with the spindle carriage and eventually one of the cam surfaces 140 will engage the pin 58 and rotate the trip rod 49. The pin 58 then engages the pin 59 and moves the hand wheel 71 and the hub 70 outwardly, and frees the frictional connection between the gears 76 and 68. The spring 83 is then effective to return the member 78 as far as the stop 84 will permit. It will be understood that the stop 84 may be set at various points by adjustment of the rod 85, in order to control the actual length of the forward slow feed of the actual drilling movement. The retrograde movement of the member 78 causes the switch 95a to return to the original position in which it is shown in Figure 14. At the same time the spring 110 pushes the rod 108 to the right.

Referring to the position in which it is shown in Figure 6, as soon as the member 118a pulls away from the boss 113 and the switch 104 and switch button 105 are restored to the closed position in which they are shown in Figure 14. The result is an automatic shift in the direction of movement of the spindle carriage, the switches being restored to original position and the coil 206 being energized. The spindle carriage then moves rapidly toward the work.

The shaft 119, and with it the cam 138, is rotated one step at each excursion of the spindle carriage. This happens on the forward excursion, when the roller 134 engages the cam 115 as shown in Figure 7. The result is a downward movement of the rack 131 and a rotation of the gear 130 which actuates the pawl 128 and thus rotates the ratchet wheel 126 one step. This, by the intermediate gearing shown in Figure 5, rotates the cam 138 one step. The result is that in the next following rearward movement of the spindle platform, the pin 58 passes through one of the channels 139 of the cam 138, instead of being engaged by the cam. The cam is thus, for that particular excursion, rendered ineffective. The carriage then continues its backward movement until the beveled portion 142 of the cam 141 engages the pin 143 associated with the handle 146 and rotates the trip rod 49. This rotation of the rod 49 causes the pin 58 to strike the pin 59 and frees the gear 76 from the gear 68. This causes the change in direction of movement as above described.

It should be kept in mind that the automatic operation can at any time be interrupted by hand levers 146 or 152. By the manipulation of either one of these levers, the trip rod 49 can be rotated to cause the spindle carriage to move forwards before the spindle carriage has completed a rearward excursion.

The movement of the drill platform may be stopped in either manual or automatic operation, by means of the directional control valve handle 168.

If movement of the spindle platform is to be manually controlled, the firing unit is released, for example by the trip handle 152.

In order to support the shaft 48 intermediate the bearings 46 of the brackets 45, I have provided a bearing 118b, secured to or integral with the bracket 118.

When the drill spindle is retracted under manual control, the movement can only be checked by pressing the proper push button. If the operator fails to do this, the mechanism which is shown generally in Figure 1 at 143, 144 and 145 will not stop its rearward movement. Should this occur, the mechanism may be pushed forward to the right, referring to the position of the parts as shown in Figure 1 until the plunger itself strikes the bottom of the hydraulic cylinder. Referring to Figures 12 and 16, it will be noted that the hand wheel 145 with its threaded stem is somewhat offset center in relation to the shaft 49. The control plug 145a which may be a turned brass pin contacts the shaft 49, as it is actuated by rotation of the hand wheel 145 and wedges itself between the shaft 49 and the body of the mechanism 145b. This in itself avoids any jarring or lost motion occasioned by the clearance between the pin 145a and the bore in which it is inserted. The following edge of the wedge pin is preferably relieved as shown in Figure 16 so that the contact is as near the point of the member 145a as possible. If therefore, the control spindle mechanism in its receiving movement under manual control, contacts the mechanism 145b, it will push it back overcoming the frictional resistance of the pin 145a and the shaft 49 and will cause no damage inasmuch as the contact is made between the steel shaft and the brass pin.

I claim:

1. In combination, a base, a machine member, means for guiding it for movement on said base, a control member, means for guiding it for movement on said base along a path generally parallel with the path of movement of the machine member, an actuating connection between said machine member and said control member adapted to move the control member along said base in response to forward movement of the machine member toward the work, means for terminating the forward movement of the machine member toward the work after a predetermined movement of the control member toward the work, means for thereupon initiating a rearward movement of the machine from the work, means on said control member for initiating a subsequent forward movement of the machine toward the work and means intermediate the machine member and the control member for actuating said means alternately after a relatively long rearward movement of the machine and after a relatively short rearward movement of the machine.

2. In combination, a base, a machine member movable on said base, means for moving said machine member toward the work at varying rates of speed, a control member for said machine member movable on said base, an actuating circuit for said machine member, a switch in said actuating circuit, on said control member, means for actuating said switch in response to forward movement of the machine member toward the work, means for initiating a different rate of movement of the machine member toward the work when said switch is actuated, and means for terminating the forward movement of the machine member toward the work after a subsequent predetermined distance of movement of the control member toward the work.

3. In combination, a base, a machine member movable thereon, means for moving said machine member rapidly toward the work, slowly toward the work, and rapidly away from the work, control means for said machine member effective, in response to the movement of the machine member toward the work, to terminate the rapid movement of the machine member toward the work and to initiate the slow movement toward the work, means adapted, after a predetermined slow movement of the machine member toward the work, to terminate the movement of the machine member toward the work and to initiate a rapid recession of the machine member from the work and means adapted, in response to the rearward movement of the machine member from the work, to initiate again a rapid movement of the machine member toward the work, and additional means for causing a termination of the rearward movement of the machine from the work after a longer rearward excursion than the rearward excursion permitted by said first mentioned means, and means for rendering said first mentioned means periodically inoperative.

4. In combination, a base, a machine carriage, means for mounting said machine carriage on said base for travel, on a rectilinear path, toward and away from the work, a control unit and means for mounting said control unit on said base for travel to and from the work along a path parallel with the path of movement of said machine carriage, a fluid pump and means for actuating it, an actuating connection between said pump and said machine carriage adapted to move said machine carriage toward the work at a predetermined speed and means, including elements on said machine carriage and on said control unit, for reducing the speed of movement of the machine carriage toward the work after machine carriage reaches a predetermined position, in relation to said control unit, in the course of the excursion of the machine carriage toward the work.

RICHARD E. BARR.

REFERENCES CITED

The following references are of record in the file of this patent:

UNITED STATES PATENTS

| Number | Name | Date |
|---|---|---|
| 1,912,184 | Ferris | May 30, 1933 |
| 2,179,640 | Vickers et al. | May 11, 1937 |
| 2,160,920 | Strawn | June 6, 1939 |
| 2,274,191 | Davis | Feb. 24, 1942 |
| 2,285,069 | Vickers | June 2, 1942 |
| 2,324,727 | Shartle | July 20, 1943 |
| 2,351,263 | Harrington et al. | June 13, 1944 |
| 1,911,132 | Macomber | May 23, 1933 |
| 1,911,138 | Clute | May 23, 1933 |
| 1,787,781 | Galloway | Jan. 6, 1931 |
| 1,924,138 | Strawn | Aug. 29, 1933 |
| 1,924,738 | Flanders | Aug. 29, 1933 |
| 1,944,362 | Oberhoffken | Jan. 23, 1934 |
| 1,984,535 | Lundahl | Dec. 18, 1934 |
| 2,000,553 | Alden | May 7, 1935 |
| 2,051,052 | Morgan | Aug. 18, 1936 |
| 2,274,603 | Herman et al. | Feb. 24, 1942 |
| 1,905,132 | Bishop et al. | Apr. 25, 1933 |
| 1,905,133 | Bishop et al. | Apr. 25, 1933 |
| 1,964,398 | Ferris | June 26, 1934 |